United States Patent [19]
Howell et al.

[11] Patent Number: 5,513,490
[45] Date of Patent: May 7, 1996

[54] HIGHWAY TRUCK WITH POWER STEERING SYSTEM AND A METHOD OF OPERATION

[75] Inventors: Michael E. Howell, Greensboro; Bjorn O. Svartz, Jamestown, both of N.C.

[73] Assignee: Volvo GM Heavy Truck Corporation, Greensboro, N.C.

[21] Appl. No.: 344,138

[22] Filed: Nov. 23, 1994

[51] Int. Cl.⁶ .............................. F16D 31/02; B01D 24/00
[52] U.S. Cl. ................................. 60/327; 60/453; 60/456; 210/416.5; 210/184
[58] Field of Search .............................. 91/375 R, 375 A, 91/434; 60/453, 327, 454, 384, 456; 280/781; 210/416.5, 186, 184, 438, 440, 441, 455

[56] References Cited

U.S. PATENT DOCUMENTS

| | | |
|---|---|---|
| 1,653,427 | 12/1927 | Beebee. |
| 2,733,662 | 2/1956 | Hunter ................................. 60/453 X |
| 2,988,888 | 6/1961 | Lauck. |
| 3,863,449 | 2/1975 | White, Jr.. |
| 3,902,318 | 9/1975 | Becker et al.. |
| 4,082,665 | 4/1978 | Schneider et al.. |
| 4,218,885 | 8/1980 | White. |
| 4,454,717 | 6/1984 | Wade et al. ................................. 60/453 |
| 4,517,083 | 5/1985 | Hayes et al.. |
| 4,559,995 | 12/1985 | Van der Stuyf. |
| 4,645,264 | 4/1987 | Morrison. |
| 4,651,526 | 3/1987 | Mann et al.. |
| 4,844,126 | 7/1989 | Uchida et al. ..................... 91/375 R X |
| 4,880,503 | 11/1989 | Molitorisz. |
| 4,903,760 | 2/1990 | Joshi et al.. |
| 4,915,192 | 4/1990 | Hayashida et al.. |
| 4,997,555 | 3/1991 | Church et al. ..................... 210/184 X |
| 5,002,117 | 3/1991 | Buckley et al.. |
| 5,009,066 | 4/1991 | VanGorder et al.. |
| 5,048,596 | 9/1991 | Lu. |
| 5,326,461 | 7/1994 | LeGrand et al. ......................... 210/186 |

*Primary Examiner*—Hoang Nguyen
*Attorney, Agent, or Firm*—Watts, Hoffmann, Fisher & Heinke Co.

[57] ABSTRACT

An over the highway truck having a power steering system including an improved hydraulic circuit for operation of the system is disclosed. The system includes a heat conductive metal frame element, a power steering pump, and conduits connecting an output of the pump to at least one steering assist actuator. The system also has a heat conductive, metal, hydraulic reservoir defining an internal power steering fluid chamber is connected to the frame element in heat transfer relationship. Supply and return conduits respectively connect the chamber to the pump and the actuator to provide a combination wherein the frame element and reservoir together function as a heat sink to cool power steering fluid. The reservoir has a housing having a base portion and an internally connected, upstanding, circumferentially endless side portion. The housing has flow directing passages adjacent its base portion and communicating with the chamber for delineating fluid flow across the base portion in heat transferring relationship. A process of maintaining power steering fluid at desired temperatures by circulating fluid through a reservoir in heat exchange relationship with the frame element, thereby causing the reservoir and element to function as a heat sink is also disclosed.

36 Claims, 3 Drawing Sheets

HIGHWAY TRUCK WITH POWER STEERING SYSTEM AND A METHOD OF OPERATION

This invention relates to over the highways trucks and tractors and more particularly to a truck or tractor power steering system including a novel and improved reservoir for both filtering and cooling power steering fluid.

BACKGROUND OF THE INVENTION

Power steering systems have become standard equipment on all large Class 8 over the highway trucks and tractors. In that, depending on how it is equipped, a given cab, power train and chassis may be either utilized as an over the highway truck or a highway tractor, we will use the word "truck" here to designate such a vehicle recognizing that strictly speaking the vehicle may be equipped to be either a truck or a tractor.

For many years over heating of Class 8 truck power steering systems has been a problem, especially with construction and specialty vehicles, such as cement mixers and dump trucks. This over heating causes seals and other components to fail prematurely as well as causing power steering oil breakdowns.

The steering fluid high temperature problem is most evident when a truck is operated at relatively high engine speed with little or no steering activity. The problem is most prevalent in construction and specialty vehicles because their engines often operate at high speed idles for power take-off operations and slow speed steering maneuvers such as occur as a vehicle traverses a construction site. Under high engine idle conditions the steering fluid is circulated at high flow rates from a reservoir through a pump and return which leads to so called "flow work" as pressure is dropped through the system. In addition, there is a high recirculation rate of fluid through the pump which causes further fluid heat up. This further heat up occurs because the pump, being mounted on the engine block, is at engine temperature resulting in heating of the fluid.

With modern stress on the provision of aerodynamically efficient trucks and the use of larger, higher horse power engines, under hood temperatures of all trucks including highway tractors, have increased. The increased under the hood temperatures have exacerbated the problem of over heated power steering systems so that, even in highway tractors, steering oil temperature limits of 230° F. and steering gear temperature limits of 240° F. are all too frequently exceeded.

A further factor which has contributed to the excessive steering gear temperature problems is that the fluid pressures utilized in steering systems have been increasing and it is anticipated these pressures will be increased even further. An increase in the pressure of steering gear fluid results in increased heat load and translates to higher oil and gear temperatures.

Another factor contributing to excessive steering system temperature is that the components of the system themselves retain heat and few, if any, attempts have been made toward improving heat dissipation from these components.

In the past vehicle manufacturers have universally resorted to the provision of either large oil reservoirs or air to oil coolers, or both, for cooling of steering gear oils. When power steering overheating problems are experienced by truck operators, air to oil coolers are the standard "fix". Indeed, air to oil coolers of at least as large as 3600 Btu per hour capacity have been used as solutions for power steering oil over heating problems.

While the addition of such coolers has in many instances solved the problem of oil over heating, there are nonetheless very distinct drawbacks to this solution. One obvious drawback is the cost of providing such an air to oil cooler. Another drawback is not only does such a cooler add complexity to a system, but finding a space large enough to permit mounting of such a cooler at a location where there is sufficient air flow for it to function properly can be a problem. Typically such an air to oil cooler is positioned in front of the vehicle's coolant radiator and when so positioned it decreases the efficiency of the coolant radiator to the point where the radiator, at least potentially, is inadequate to provide appropriate cooling of the engine's coolant.

SUMMARY OF THE INVENTION

A truck equipped with the power steering system of this invention has a frame rail of moderate heat conductivity, typically steel. A combination filter housing and power steering fluid reservoir is connected to the frame rail in heat transfer relationship so that the frame rail functions as a heat sink. Since the frame rail runs the length of the truck with a major portion external of the engine compartment heat dissipation by the frame rail is normally adequate to maintain power steering oil and steering system components at desired operating temperature levels.

The reservoir includes a body of moderate to high thermal conductivity, preferably an aluminum alloy or other metal of comparable thermal conductivity. The reservoir is positioned in close proximity to the power steering pump and the steering gear to minimize plumbing complexities and to reduce pipe head losses.

The reservoir body includes a base portion with integrally formed inlet and outlet passages. The body also includes a cylindrically contoured internal filter receiving chamber that is coaxially aligned with the inlet, so that power steering oil on entering the reservoir enters the interior of a filter to pass radially outwardly through the filter.

The reservoir base includes a portion which is bolted to the frame rail to fix a heat transfer section of the base to the rail in thermal transfer engagement. A plurality of arcuately contoured upstanding ribs project upwardly from the interior of this base section to define heat transfer flow passages for filtered oil flowing from the chamber to the outlet for delivery to a power steering pump.

An internal filter support or disc is positioned on top of the ribs to close the heat transfer passages. The base includes a raised section adjacent the heat transfer section, so that the base sections together form, in at least one plane of cross section, an inner surface of stepped configuration. The outlet passage straddles the step between the heat transfer and raised base sections. The disc extends over the outlet opening to isolate the outlet from direct communication with the filter chamber, so that all exiting flow of fluid passes through the heat transfer passages in heat transfer relationship. The disc extends from a location over the outlet passage to a diametrically opposite location where an end surface of the disc is in spaced relationship with the step and the raised section. This spaced relationship delineates an inlet to the heat transfer passages, so that all exiting coolant flow is over the heat transfer section. The flow of power steering oil through the heat transfer passages as the oil flows towards the reservoir outlet maximize the heat transfer to the heat sink rail.

The reservoir body preferably further includes a plurality of external outwardly projecting fins for air cooling heat transfer to further enhance the oil cooling capacity of the reservoir.

The heat transfer capabilities of a power steering system made in accordance with this invention can be calculated according to the following heat transfer equations:

Flow Work $$q_f(\text{flow}) = Q * p * (\Delta P/p + (h_l)p + (h_l)m)$$

where, qf is the power generated by flow work (W)
Q is the volumetric flow rate (m3/s)
p is the density of the fluid (kg/m3)
DelP is the gear pressure drop (Mpa=>kg/m*s2)
(hl) p is head loss due to pipe length (m2/s2)
and
(hl) m is the minor head losses (m2/s2)

Convection $$q(\text{conv}) = h * As * (Ts - T\infty)$$

where, q(conv) is the convective heat flow (W)
h is the convective heat transfer coefficient (W/m2*K)
As is the surface area (m2)
Ts is the surface temperature (K)
and
T∞ is the ambient air temperature (K)

Conduction $$q(\text{cond}) = k * Ac * \Delta T / \Delta x$$

where, q(cond) is the conductive heat flow (W)
k is the conductive heat transfer coefficient (W/m*K)
Ac is the cross sectional area (m2)
ΔT is the temperature difference (K)
and
ΔX is the distance (m).

For example, utilizing these formulas, the total expected heat output for the power steering system of a typical highway tractor manufactured by Volvo GM Heavy Truck Corporation is 100 Watts. The potential heat dissipation through convection of the novel and improved reservoir of this invention is 120 Watts, while the conductive heat dissipation through the coupled frame rail is 907 Watts, for a total of 1027 Watts of heat dissipation capability. Clearly, the heat dissipation capability of the power steering system of this invention is more than adequate to handle power steering cooling for a typical truck operating under severe conditions.

A cover is mounted atop the reservoir body to dose the chamber. The cover includes a breather passage and is constructed to provide oil level inspection. The cover is alternatively facilely removable or equipped with a normally cap closed fill opening to facilitate fresh power steering oil addition to the system. Level inspection is accommodated in one embodiment through the fill opening and in the other through a transparent window provided in the facilely removable cover.

Accordingly, the object of this invention is to provide a novel and improved truck power steering system and a method of cooling oil and components of such a system.

DETAILED DESCRIPTION

Figure 1:
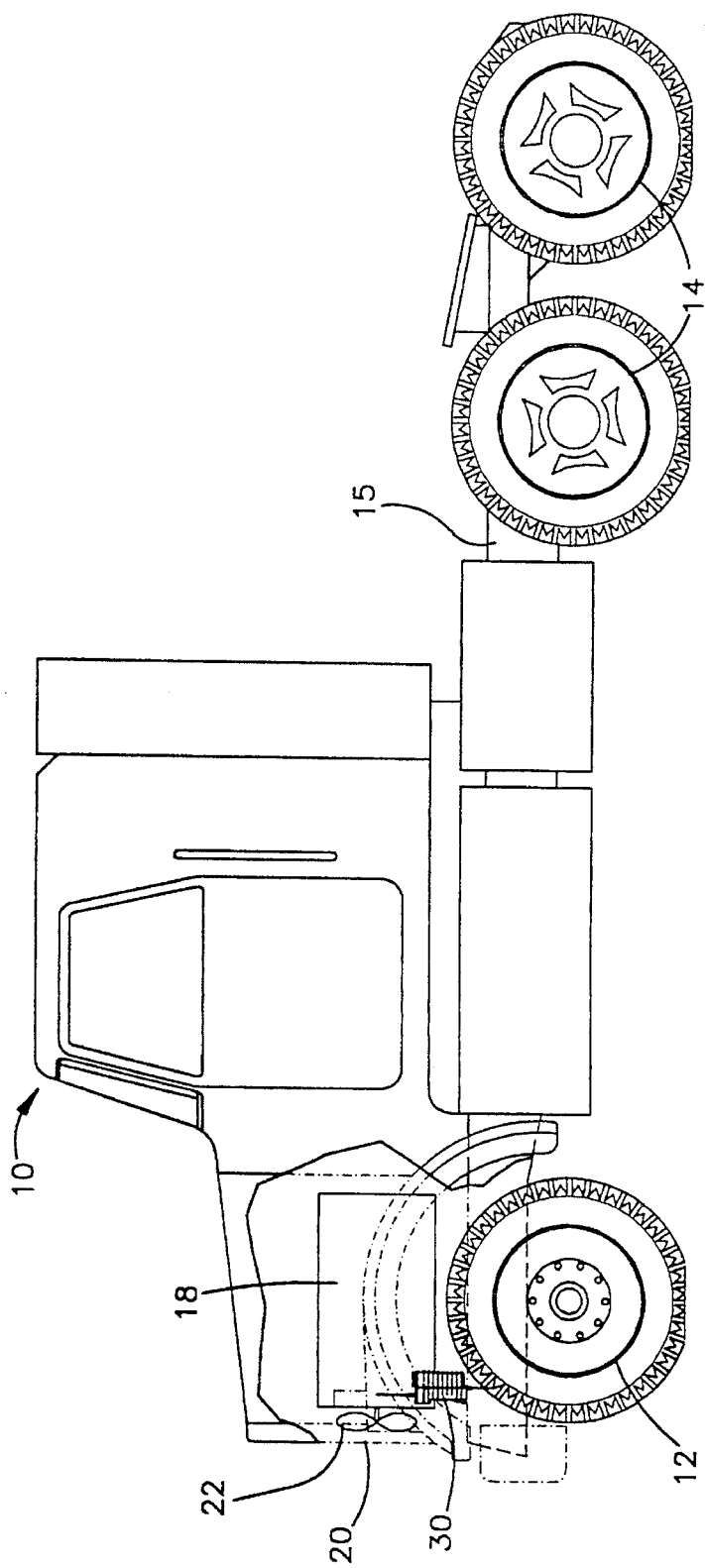
FIG. 1 is an elevational view of a truck equipped with a power steering system including the novel and improved filter and cooling reservoir of this invention.
Figure 2:
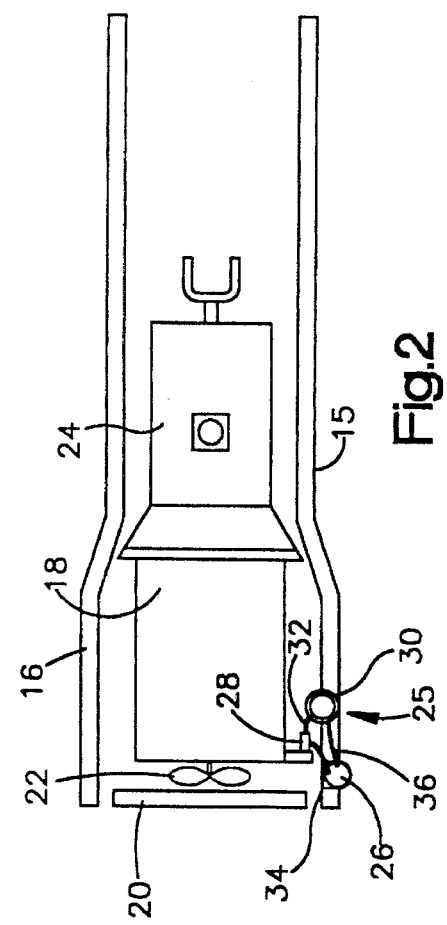
FIG. 2 is a schematic plan view of the frame rails, engine transmission and radiator of a vehicle equipped with the power steering system of this invention.

Referring to the drawings and to FIGS. 1 and 2 in particular, an over the highway truck is shown generally at 10. The truck includes the usual front steerable wheels 12 and rear drive wheels 14. Left and right hand frame rails 15, 16 are connected to the wheels 12, 14 and extend virtually the entire length of the vehicle. The frame rails 15, 16 support an engine shown generally at 18 which is equipped with a conventional radiator 20 and fan 22. A transmission 24 couples the engine output to the rear traction wheels 14 in a conventional manner.

Referring now principally to FIG. 2, a power steering system is shown generally at 25. The power steering systems includes a steerable wheel actuator in the form of a steering gear 26. A power steering pump 28 is drivingly connected to and carried by the engine 18 in a known manner. A novel and improved fluid reservoir 30 is connected to the frame rail 15 in heat transfer relationship. An input or supply conduit 32 couples an outlet 33 of the reservoir to the power steering pump 28. A high pressure line couples the power steering pump 28 to the actuator 26 while a return line 36 couples the actuator 26 to a reservoir inlet 38.

Figure 3:
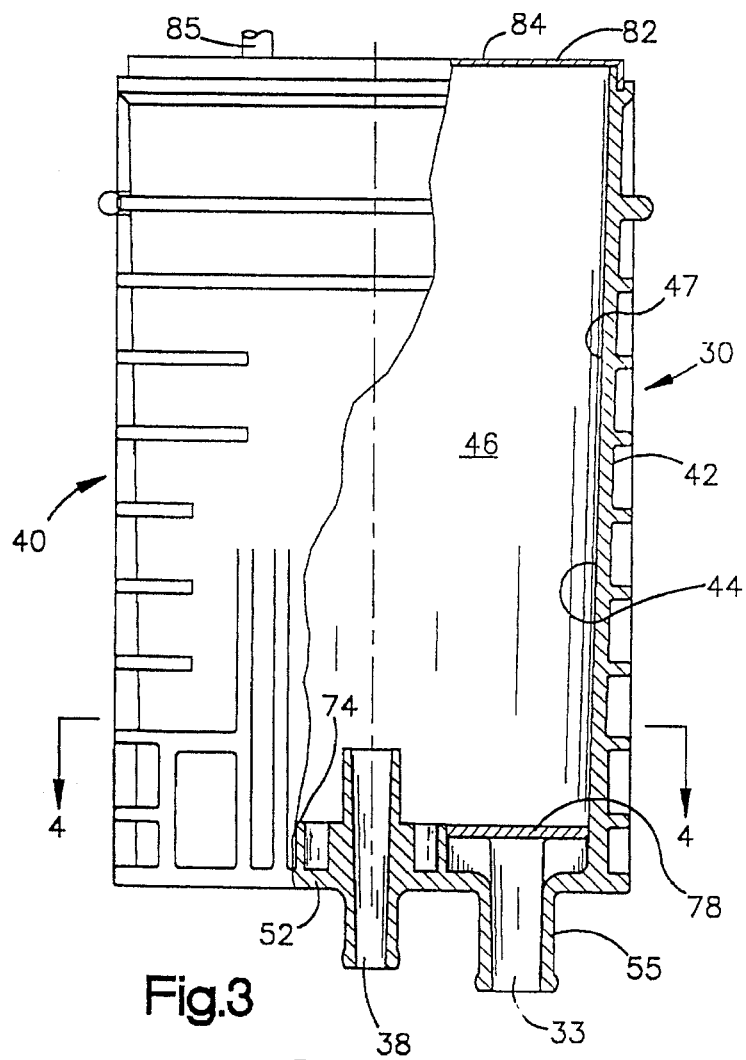
FIG. 3 is a partially sectioned, elevational view of the filter housing of the novel and improved reservoir of this invention.
Figure 4:
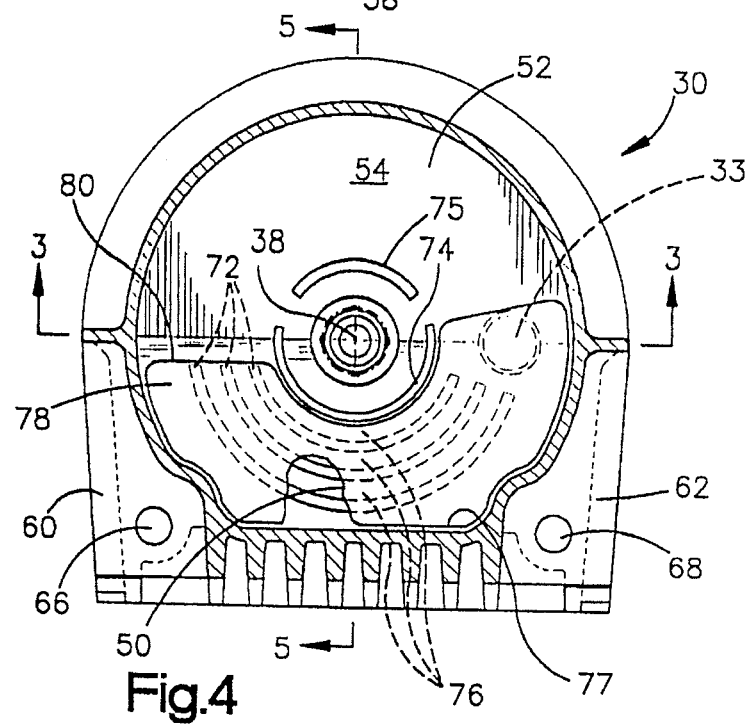
FIG. 4 is a sectional view of the housing of FIG. 2 from the plane indicated by the line 4—4 of FIG. 3; and, FIG. 5 is a sectional view of the housing of FIGS. 3 and 4 from the plane indicated by the line 5—5 of FIG. 4.
Figure 5:
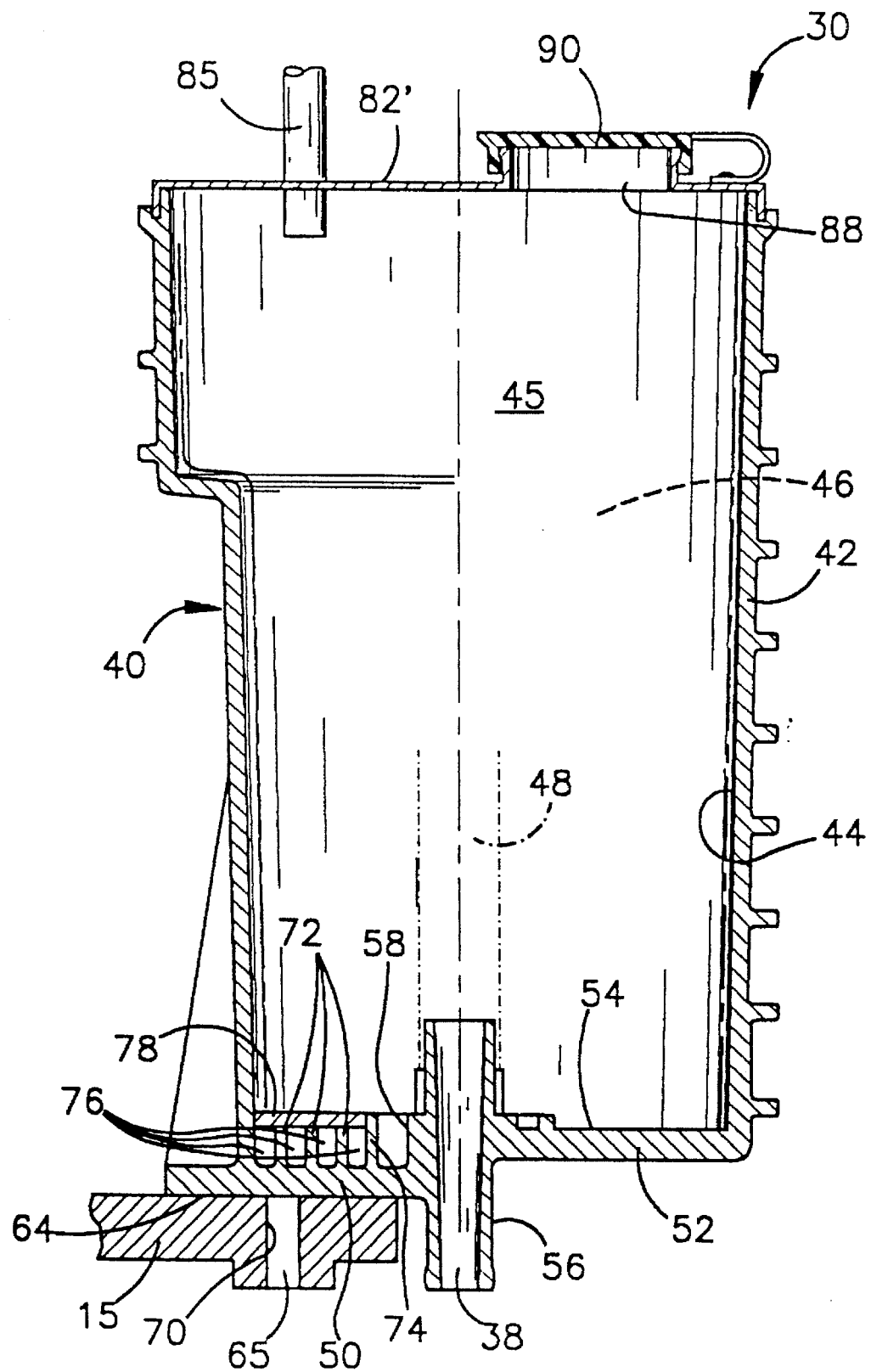

Referring now to FIGS. 3–5, the novel and improved reservoir is shown on an enlarged scale and in greater detail. The reservoir 30 includes a cast unitary housing 40. The housing 40 is formed of a high heat conductivity metal. Aluminum alloys are the preferred materials for the housing 40.

The housing 40 includes an imperforate, upstanding sidewall 42. The sidewall 42 has an internal, sidewall surface 44 defining the perimeter of an internal steering fluid chamber 45. When the system is in use, a tubular filter 46 shown in phantom lines in FIG. 5 is positioned in the chamber 45 in concentric relationship with a cylindrically contoured portion 47 of the sidewall surface 44. The filter 46 includes a central opening 48 that is axially aligned with, and in fluid communication with, the inlet passage 38. The housing 40 includes a base having a heat transfer section 50 and a raised section 52. The sections 50, 52 delineate an internal base surface 54 forming the bottom of the chamber 45. This surface is stepped in cross section when viewed in the plane represented by FIG. 5.

The base includes tubular portions 55, 56 which respectively define the outlet and inlet openings 33, 38. The base surface 54 includes a step or shoulder 58 located, when in use, in a vertical plane which includes the axis of the inlet and outlet passages 38, 33.

The housing includes a pair of mounting bosses 60, 62 (FIG. 4) which project laterally and oppositely from the heat transfer section 50. The heat transfer section 50 and the bosses 60, 62 have a common planar external surface 64 which is juxtaposed against the frame rail 15 in tight thermally conductive contact. Bolts, one of which is shown at 65 in FIG. 4, project through apertures 68 respectively formed in the bosses 60, 62 and mating apertures, one of which is shown at 70 in FIG. 4, in the frame rail 15.

The heat transfer section 50 includes three upstanding, arcuately contoured, heat transfer ribs 72 which project upwardly into the chamber 45. The heat transfer ribs are located in concentric relationship with the inlet opening 38. A filter support rib 74 is disposed concentrically between the heat transfer ribs 72 and the inlet 38 extending upwardly further than the heat transfer ribs 72. A complemental filter support rib 75 of relatively short arcuate configuration is disposed on a side of the outlet passage opposite the filter support rib 74. The support rib 75 projects upwardly from the raised section 52 to a level equal to the height of the support rib 74.

The filter support rib 74, the heat transfer ribs 72 and the sidewall surface 44 collectively define a set of four heat transfer, fluid flow passages 76. A disc 78 rests atop the heat transfer ribs 72 to delineate the top of the heat transfer flow passages 76.

The disc 78 has a radially inward surface which is arcuately curved and juxtaposed with the filter support ring 74. The disc also has a configured outer surface which is adjacent a lower noncylindrical section 77 of the sidewall 44.

The disc 78 also overlies the exit opening 33. At a location diametrically opposite the exit opening 33, an inlet surface 80 of the disc 78 is positioned in spaced relationship with the shoulder 58 to delineate an inlet opening to the four heat transfer passages 76. Thus, virtually all exiting flow of fluid from the reservoir 30 must pass under the disc 78 and through the heat transfer passages 76 to assure maximum heat transfer to the heat transfer section 50 and thence to the frame rail 15 for optimized power steering fluid cooling.

Referring now to FIG. 3, a cover 82 is mounted atop the housing 40 to close and complete the chamber 45. The cover 82 is easily removable for the addition of power steering fluid to the chamber 45. The cover 82 includes a window 84 for fluid level inspection of the contents of the housing 40. The cover 82 also includes a breather 85.

Referring to now to FIG. 5, a modified cover 82' is shown. The cover 82' includes a fill opening 88 normally closed by a moveable cap 90. The fill opening may be used for both fluid level inspection and fluid addition.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

We claim:

1. In an over the highway truck having a power steering system an improved hydraulic circuit for operation of the system comprising in combination:
   a) a heat conductive metal frame element;
   b) a power steering pump;
   c) conduits connecting an output of the pump to at least one steering assist actuator;
   d) a heat conductive, metal, hydraulic reservoir connected to the frame element in heat direct transfer relationship, the reservoir defining an internal power steering fluid chamber; and,
   e) supply and return conduits respectively connecting the chamber to the pump and said at least one actuator whereby to provide a combination wherein the frame element and reservoir together function as a heat sink to cool power steering fluid.

2. The combination of claim 1 wherein there is an hydraulic fluid filter in the chamber and the connection of the supply conduit is positioned to receive hydraulic fluid after it flowed from the return conduit through the filter.

3. The combination of claim 1 wherein the reservoir includes external heat dissipation fins.

4. The combination of claim 1 wherein the reservoir is formed of aluminum alloys.

5. The power steering system of claim 1 wherein the reservoir is a combination filter housing and fluid structure comprising:
   a) a metal housing having a base portion and an internally connected, upstanding, circumferentially endless side portion;
   b) the base and side portions delineating the internal chamber;
   c) a cover removably connectable to the housing to complete the boundaries of the chamber;
   d) the structure including inlet portions connected to one of the conduits and defining an inlet passage communicating with the chamber and positioned to introduce steering fluid into an interior portion of a filter positioned in the chamber;
   e) the structure also including outlet portions connected to another of the conduits and defining an outlet communicating with and extending from the chamber; and,
   f) the structure including flow directing passages adjacent the base portion and communicating with the chamber for delineating fluid flow across the base portion in heat transferring relationship.

6. The system of claim 5 wherein the cover includes a fill opening and a selectively removable closure.

7. The system of claim 6 wherein the cover further includes a breather passage.

8. The system of claim 5 wherein the side portion has an inner cylindrical surface and wherein the inlet passage is axially aligned with the surface.

9. The system of claim 5 wherein a filter support disc is positioned in the chamber near the flow directing passages and the base.

10. The system of claim 5 wherein the housing is an aluminum alloy.

11. For use in a power steering system, a combination filter housing and fluid reservoir structure comprising:
    a) a metal housing having a base portion and an internally connected, upstanding, circumferentially endless side portion;
    b) the base and side portions delineating an internal filter receiving chamber;
    c) a cover removably connectable to the housing to complete the boundaries of the chamber;
    d) the structure including inlet portions defining an inlet passage communicating with the chamber and positioned to introduce steering fluid into an interior portion of a filter positioned in the chamber;
    e) the structure also including outlet portions including at least one rib part defining an outlet communicating with and extending from the chamber; and, f) the structure including flow portions delineating flow directing passages adjacent the base portion and communicating with the chamber for directing fluid flow across the base portion in heat transferring relationship.

12. The structure of claim 11 wherein the cover includes a fill opening and a selectively removable closure.

13. The structure of claim 12 wherein the cover further includes a breather passage.

14. The structure of claim 11 wherein the side portion has an inner cylindrical surface and wherein the inlet passage is axially aligned with the surface.

15. The structure of claim 11 wherein a filter support disc is positioned in the chamber near the flow directing passages and the base.

16. The structure of claim 11 wherein the housing is an aluminum alloy.

17. For use in a power steering system, a combination filter housing and fluid reservoir structure comprising:
   a) a metal housing having a base portion and an internally connected, upstanding, circumferentially endless side portion;
   b) the base and side portions delineating an internal filter receiving chamber;
   c) a cover removably connectable to the housing to complete the boundaries of the chamber;
   d) the structure including inlet portions defining an inlet passage communicating with the chamber and positioned to introduce steering fluid into an interior portion of a filter positioned in the chamber;
   e) the structure also including outlet portions defining an outlet communicating with and extending from the chamber;
   f) the structure including flow portions delineating flow directing passages adjacent the base portion and communicating with the chamber for directing fluid flow across the base portion in heat transferring relationship; and,
   g) the base portion including a heat transfer section for heat transfer engagement with a vehicle frame rail and a second section to one side of and spaced above the heat transfer section when the structure is in use, the flow portions being ribs projecting upwardly from the heat transfer portion into the chamber.

18. The structure of claim 17 wherein the ribs are arcuate.

19. For use in a power steering system, a combination filter housing and fluid reservoir structure comprising:
   a) a metal body defining a base and an integral, cylindrically contoured side wall in upstanding relationship with the base;
   b) the base and side wall being imperforate and delineating a bottom and perimeter of an internal filter receiving chamber;
   c) the base including mounting portions delineating frame connections for fixing the body to a vehicle frame rail in heat transfer relationship;
   d) a cover removably connectable with the body to close the chamber;
   e) the base including an inlet portion delineating a fluid inlet passage in communication with and in axial alignment with the chamber for introducing fluid to be filtered into an interior space of a filter positioned in the chamber;
   f) the base also including an outlet portion defining an outlet passage;
   g) the base also including an upstanding set of flow directing arcuately contoured, ribs in radially spaced relationship and delineating flow control channels communicating with the chamber and with the outlet passage; and,
   h) a filter support positioned near the base and above the ribs for supporting a filter above said channels when the structure is in use.

20. The structure of claim 19 wherein the ribs are integrally formed parts of the body.

21. The structure of claim 19 wherein the filter support is a disc.

22. The structure of claim 21 wherein the disc is imperforate.

23. The structure of claim 19 wherein the cover includes a fill opening and a selectively removable closure.

24. The structure of claim 23 wherein the cover further includes a breather passage.

25. The structure of claim 19 wherein the body metal is an aluminum alloy.

26. The structure of claim 24 wherein the body includes external heat dissipating fins.

27. In an over the highway truck an improved power steering system comprising:
   a) a vehicle frame including at least one longitudinally extending rail composed of a high conductive metal;
   b) a steering actuator operatively coupled to a steerable vehicle wheel for providing a vehicle steering force in response to operator caused signals;
   c) a power steering pump;
   d) a reservoir;
   e) conduits interconnecting the actuator, the pump and the reservoir to complete the system; and,
   f) said reservoir including:
      i) a body composed of heat transfer metal, the body including a base secured to said at least one rail in direct heat transfer relationship, such that said at least one frame rail functions as a heat sink, the body also including an upstanding, circumferentially endless side wall;
      ii) a cover secured to the body to complete the reservoir, the cover and body together defining an internal fluid chamber adapted to house a fluid filter when the system is in use; and,
      iii) portions defining inlet and outlet passages providing fluid communication between the chamber and certain of the conduits.

28. The system of claim 27 wherein the portions defining the passages are in the base.

29. The system of claim 27 wherein the body is composed of an aluminum alloy.

30. A combination reservoir and filter housing for use in a power steering system comprising:
   a) a unitary, high heat transfer, metal body including a base and an imperforate side wall;
   b) the side wall having an internal, generally cylindrical surface delineating the perimeter of a filter receiving fluid chamber;
   c) the base including portions delineating inlet and outlet passages, the inlet passage being axially aligned with the cylindrical surface whereby to input fluid into a central opening of a tubular filter when such a filter is positioned in the chamber;
   d) the base having a heat transfer section for heat transfer engagement with a vehicle frame rail, the base including an adjoining section adjacent to the heat transfer section;

e) the adjoining section being above the heat transfer section when the side wall is upstanding, the sections having an inner surface delineating the base of the chamber;

f) the inner surface being of stepped configuration in at least one plane of cross-section; and, g) the base section including upstanding ribs projecting into the chamber from adjacent parts of the inner surface to delineate heat transfer fluid flow passages each between an adjacent pair of ribs.

31. The housing of claim 30 further including a cover having level inspection means for determining the level of fluid in the chamber.

32. The housing of claim 31 wherein the inspection means comprises a window.

33. The housing of claim 31 wherein the inspection means comprises a fill opening with a selectively openable cap.

34. The housing of claim 30 wherein the body metal is an aluminum alloy.

35. A process of maintaining power steering fluid of an over the highway truck power steering system at desired temperatures without over heating the fluid, the process comprising:

a) securing a base of a high heat conductivity fluid reservoir in thermal transfer relationship to a metal frame rail;

b) circulating fluid through the system and as it is circulating filtering the fluid by passing it through a filter in the reservoir; and, c) cooling the fluid by causing the fluid to flow across the base prior to being withdrawn from the reservoir thereby causing heat energy to be directly transferred from the fluid to the frame rail and the frame rail to function as a heat sink.

36. The process of claim 35 wherein the step of causing the fluid to flow across the base includes causing the fluid to flow through fluid passages terminating near an outlet from the reservoir.

* * * * *